United States Patent
Skinner et al.

(10) Patent No.: US 9,796,165 B2
(45) Date of Patent: Oct. 24, 2017

(54) IGNITION COIL AND METHOD OF ASSEMBLY

(71) Applicant: DELPHI TECHNOLOGIES, INC., Troy, MI (US)

(72) Inventors: Albert A. Skinner, Waterford, MI (US); Harry O. Levers, Jr., Clarkston, MI (US); Mary A. Skinner, Waterford, MI (US); Marco Meza, Juarez (MX)

(73) Assignee: DELPHI TECHNOLOGIES, INC., Troy, MI (US)

( * ) Notice: Subject to any disclaimer, the term of this patent is extended or adjusted under 35 U.S.C. 154(b) by 408 days.

(21) Appl. No.: 14/531,407

(22) Filed: Nov. 3, 2014

(65) Prior Publication Data

US 2015/0167622 A1 Jun. 18, 2015

Related U.S. Application Data

(60) Provisional application No. 61/917,588, filed on Dec. 18, 2013.

(51) Int. Cl.
| | |
|---|---|
| H01F 27/04 | (2006.01) |
| B32B 37/12 | (2006.01) |
| H01F 41/04 | (2006.01) |
| B32B 37/14 | (2006.01) |
| H01F 38/12 | (2006.01) |
| F02P 3/02 | (2006.01) |

(52) U.S. Cl.
CPC ........ *B32B 37/1284* (2013.01); *B32B 37/142* (2013.01); *H01F 27/04* (2013.01); *H01F 38/12* (2013.01); *H01F 41/04* (2013.01); *B32B 2037/1246* (2013.01); *B32B 2457/00* (2013.01); *F02P 3/02* (2013.01)

(58) Field of Classification Search
CPC ......................... H01F 27/00–27/30; H01F 5/00
USPC .......................................... 336/65, 200, 232
See application file for complete search history.

(56) References Cited

U.S. PATENT DOCUMENTS

| | | |
|---|---|---|
| 6,208,231 B1 | 3/2001 | Oosuka et al. |
| 8,564,392 B1 | 10/2013 | Skinner et al. |

(Continued)

FOREIGN PATENT DOCUMENTS

| | | |
|---|---|---|
| CN | 2704910 Y | 6/2005 |
| DE | 10 2010 001 814 A1 | 8/2011 |
| EP | 1793397 A2 | 6/2007 |

(Continued)

OTHER PUBLICATIONS

Li Li and J.E. Morris: "An Introduction to Electrically Conductive Adhesive", Nov. 9, 2006, pp. 6-31, XP002738520.

*Primary Examiner* — Tuyen Nguyen
(74) *Attorney, Agent, or Firm* — Joshua M. Haines

(57) ABSTRACT

An ignition coil for delivering a spark-generating current to a spark plug includes a magnetically-permeable core; a primary winding disposed outward of the core; and a secondary winding disposed outward of the primary winding and inductively coupled to the primary winding. The secondary winding terminates at one end thereof in a low-voltage end and terminates at another end thereof in a high-voltage end. At least one of the low-voltage end of the secondary winding and the high-voltage end of the secondary winding is electrically connected directly to a terminal through an electrically conductive polymer.

23 Claims, 4 Drawing Sheets

(56) References Cited

U.S. PATENT DOCUMENTS

2013/0291844 A1 11/2013 Skinner et al.
2015/0364246 A1* 12/2015 Skinner ................ H01F 27/325
                                                                                      336/198

FOREIGN PATENT DOCUMENTS

| JP | S6358910 A1 | 3/1988 |
| JP | 2005286077 A1 | 10/2005 |
| KR | 970005493 | 5/1994 |

* cited by examiner

IGNITION COIL AND METHOD OF ASSEMBLY

CROSS-REFERENCE TO RELATED APPLICATIONS

This patent application claims the benefit of U.S. provisional patent application Ser. No. 61/917,588 filed on Dec. 18, 2013, the disclosure of which is hereby incorporated by reference in its entirety.

TECHNICAL FIELD OF INVENTION

The present invention relates to an ignition coil for developing a spark-generating current that is applied to one or more spark plugs of an internal combustion engine.

BACKGROUND OF INVENTION

Ignition coils are known for use in connection with an internal combustion engine such as an automobile engine. Ignition coils typically include a core around which is wound a primary winding. A secondary winding is wound around a secondary winding spool to surround the primary winding such that a high voltage is induced on the secondary winding when an electric current applied to the primary winding is stopped. One end of the secondary winding is a low voltage end which is connected to a ground terminal while the other end of the secondary winding is a high voltage end which is connected to a high voltage terminal which is in electrical communication with a spark plug, thereby delivering a spark-generating current to the spark plug.

Connecting the low voltage end and the high-voltage end of the secondary winding to their respective terminals may be complex and costly. In order to attach the low-voltage end of the secondary winding to the low-voltage terminal, the low-voltage end is wrapped onto the low-voltage terminal, and then dipped into solder in order to strip the wire and make the electrical connection. In order to attach the high-voltage end of the secondary winding to the high-voltage terminal, the high-voltage end of the secondary winding is wrapped onto the high-voltage terminal, and then dipped into solder in order to strip the wire and make the electrical connection. Due to the high-voltage terminal being at high-voltage in use, they typically need to be bent and formed to minimize electric field concentrations at the tip. In the case of both the low-voltage end and the high-voltage end of the secondary winding, the terminals need to be assembled to the spool and terminated, then formed in some manner. Furthermore, a resistor is typically added between the secondary winding and the spark plug in order to suppress radio frequency interference (RFI). The addition of a resistor adds additional cost to the system.

Korean Patent No. KR970005493 teaches using a conductive epoxy to provide electric communication between a terminal pin and an external terminal. However, the terminal pin must still be connected to the high-voltage end of the secondary winding in a conventional manner.

What is needed is an ignition coil which minimizes or eliminates one or more of the shortcomings as set forth above.

SUMMARY OF THE INVENTION

Briefly described, an ignition coil is provided for delivering a spark-generating current to a spark plug. The ignition coil includes a magnetically-permeable core, a primary winding disposed outward of the core, and a secondary winding disposed outward of the primary winding and inductively coupled to the primary winding. The secondary winding terminates at one end thereof in a low-voltage end and terminates at another end thereof in a high-voltage end. At least one of the low-voltage end of the secondary winding and the high-voltage end of the secondary winding is electrically connected directly to a terminal through an electrically conductive polymer.

A method is also provided for assembling an ignition coil for delivering a spark-generating current to a spark plug where the ignition coil includes a magnetically-permeable core, a primary winding disposed outward of the core, and a secondary winding disposed outward of the primary winding and inductively coupled to the primary winding such that the secondary winding terminates at one end thereof in a low-voltage end and the secondary winding terminates at another end thereof in a high-voltage end. The method includes providing an electrically conductive polymer and using the electrically conductive polymer to directly electrically connect at least one of the low-voltage end of the secondary winding and the high-voltage end of the secondary winding to a terminal through the electrically conductive polymer.

The ignition coil and method of assembling the ignition coil eliminates the need for processing steps for preparing the ends of the secondary winding and soldering the ends of the secondary winding to respective terminals.

BRIEF DESCRIPTION OF DRAWINGS

This invention will be further described with reference to the accompanying drawings in which:

FIG. 2 is a simplified cross-section view of the ignition coil of FIG. 1 taken through a second plane that is substantially parallel to the first plane through which FIG. 1 is sectioned;

DETAILED DESCRIPTION OF INVENTION

Figure 1:
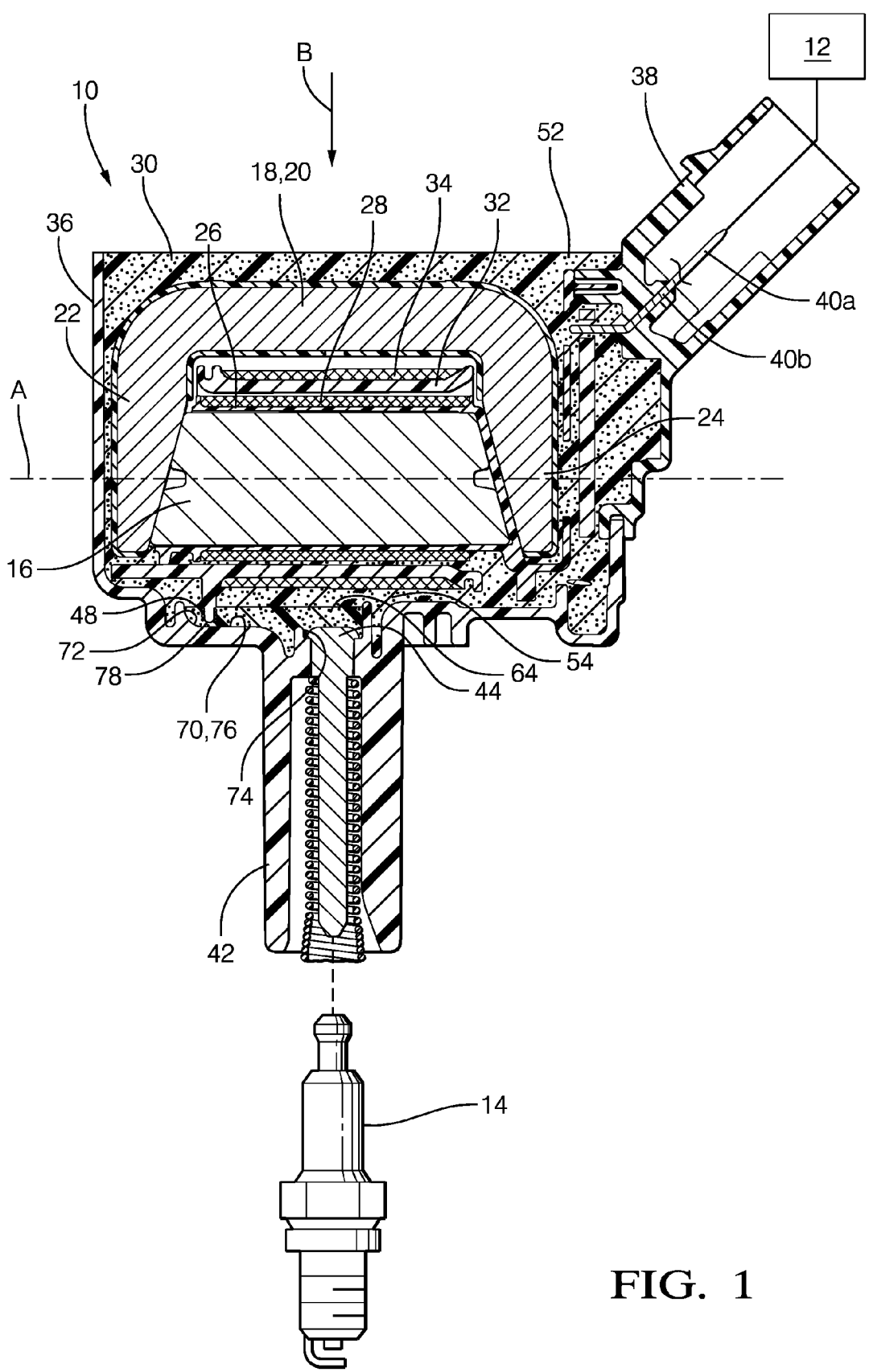
FIG. 1 is a simplified cross-section view of an ignition coil in accordance with the present invention taken through a first plane.
Figure 2:
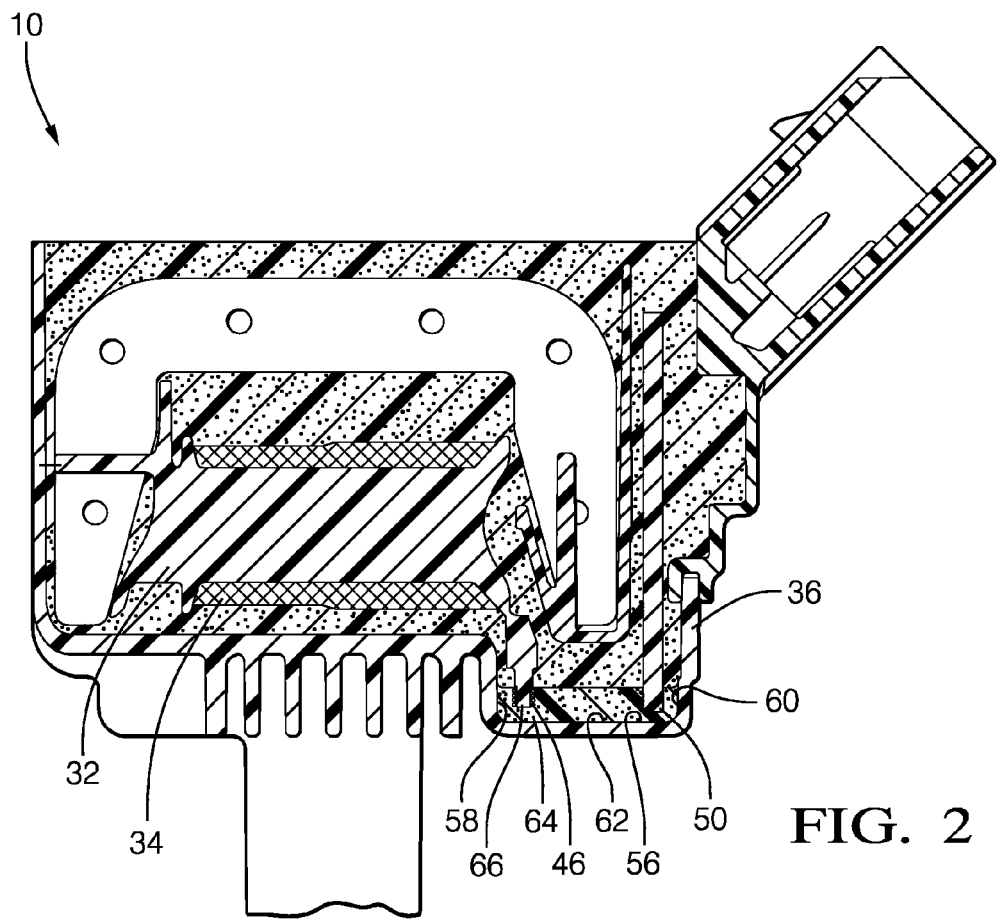

Reference will first be made to FIGS. 1 and 2 which show simplified cross-section views of an ignition coil 10 where FIGS. 1 and 2 are sectioned by parallel planes. Ignition coil 10 may be controlled by a control unit 12 or the like. Ignition coil 10 is configured for connection to a spark plug 14 that is in threaded engagement with a spark plug opening (not shown) in an internal combustion engine (also not shown). Ignition coil 10 is configured to deliver a high-voltage spark-generating current to spark plug 14, as shown. Generally, overall spark timing (dwell control) and the like is provided by control unit 12. One ignition coil 10 may be provided per spark plug 14.

Ignition coil 10 may include a magnetically-permeable core 16, a magnetically-permeable structure 18, hereinafter referred to as high-permeance structure 18, configured to provide a high permeance magnetic return path which has a base section 20 and a pair of legs 22 and 24, a primary winding spool 26, a primary winding 28, a quantity of encapsulant 30 such as an epoxy potting material, a secondary winding spool 32, a secondary winding 34, a case 36, a low-voltage connector body 38 having primary terminals 40a, 40b, a high-voltage tower 42, and a high-voltage terminal 44.

Core 16 extends along a core longitudinal axis A. Core 16 may be made of laminated steel plates, compression molded insulated iron particles, or other appropriate material. Core 16 may be any cross-sectional shape known to those of ordinary skill in the art, for example only, oval or circular.

Primary winding spool 26 is configured to receive and retain primary winding 28. Primary winding spool 26 is disposed adjacent to and radially outward of core 16 and is preferably in coaxial relationship therewith. Primary winding spool 26 may comprise any one of a number of conventional spool configurations known to those of ordinary skill in the art. In the illustrated embodiment, primary winding spool 26 is configured to receive one continuous primary winding. Primary winding spool 26 may be formed generally of electrical insulating material having properties suitable for use in a relatively high temperature environment. For example, primary winding spool 26 may comprise plastic material such as PPO/PS (e.g., NORYL® available from General Electric) or polybutylene terephthalate (PBT) thermoplastic polyester. It should be understood that there are a variety of alternative materials that may be used for primary winding spool 26.

Primary winding 28, as described above, is wound onto primary winding spool 26. Primary winding 28 includes first and second ends that are connected to the primary terminals 40a, 40b in low-voltage connector body 38. Primary winding 28 is configured to carry a primary current $I_P$ for charging ignition coil 10 upon control of control unit 12. Primary winding 28 may comprise copper, insulated magnet wire, with a size typically between about 20-23 AWG.

Secondary winding spool 32 is configured to receive and retain secondary winding 34. Secondary winding spool 32 is disposed adjacent to and radially outward of the central components comprising core 16, primary winding spool 26, and primary winding 28 and, preferably, is in coaxial relationship therewith. Secondary winding spool 32 may comprise any one of a number of conventional spool configurations known to those of ordinary skill in the art. In the illustrated embodiment, secondary winding spool 32 is configured for use with a continuous winding strategy (e.g., progressive winding) where secondary winding 34 is wound uninterrupted around secondary winding spool 32. However, it should be understood that other known configurations may be employed, such as, for example only, a segmented winding strategy where a plurality of axially spaced ribs on secondary winding spool 32 forms a plurality of channels therebetween. Secondary winding spool 32 may be formed generally of electrical insulating material having properties suitable for use in a relatively high temperature environment. For example, secondary winding spool 32 may comprise plastic material such as PPO/PS (e.g., NORYL available from General Electric) or polybutylene terephthalate (PBT) thermoplastic polyester. It should be understood that there are a variety of alternative materials that may be used for secondary winding spool 32. Further features of secondary winding spool 32 will be described in greater detail later.

Secondary winding 34 includes a low-voltage end 46 (shown in FIG. 2) and a high-voltage end 48 (shown in FIG. 1). Low-voltage end 46 may be electrically connected to a low-voltage terminal 50 within case 36 which is connected to ground by way of a ground connection through low-voltage connector body 38. The electrical connection of low-voltage end 46 to low-voltage terminal 50 will be discussed in greater detail later. High-voltage end 48 is electrically connected to high-voltage terminal 44 as will also be discussed in greater detail later. Secondary winding 34 may be implemented using conventional approaches and material (e.g. copper, insulated magnet wire) known to those of ordinary skill in the art.

High permeance structure 18 is configured to provide a high permeance magnetic return path for the magnetic flux produced in core 16 during operation of ignition coil 10. High permeance structure 18 may be formed, for example, from a stack of silicon steel laminations or other adequate magnetic material. As described previously, high permeance structure 18 includes base section 20 and a pair of legs 22 and 24. Core 16 is positioned between legs 22 and 24 such that core longitudinal axis A passes through legs 22 and 24. One end of core 16 mates with leg 22 while the other end of core 16 forms a gap with leg 24 where the gap may be in a range of, for example only, about 0.5 mm to about 2 mm. Further features of high permeance structure 18 are described in United States Patent Application Publication No. US 2013/0291844 A1 to Skinner et al., the disclosure of which is incorporated herein by reference in its entirety.

Figure 3:
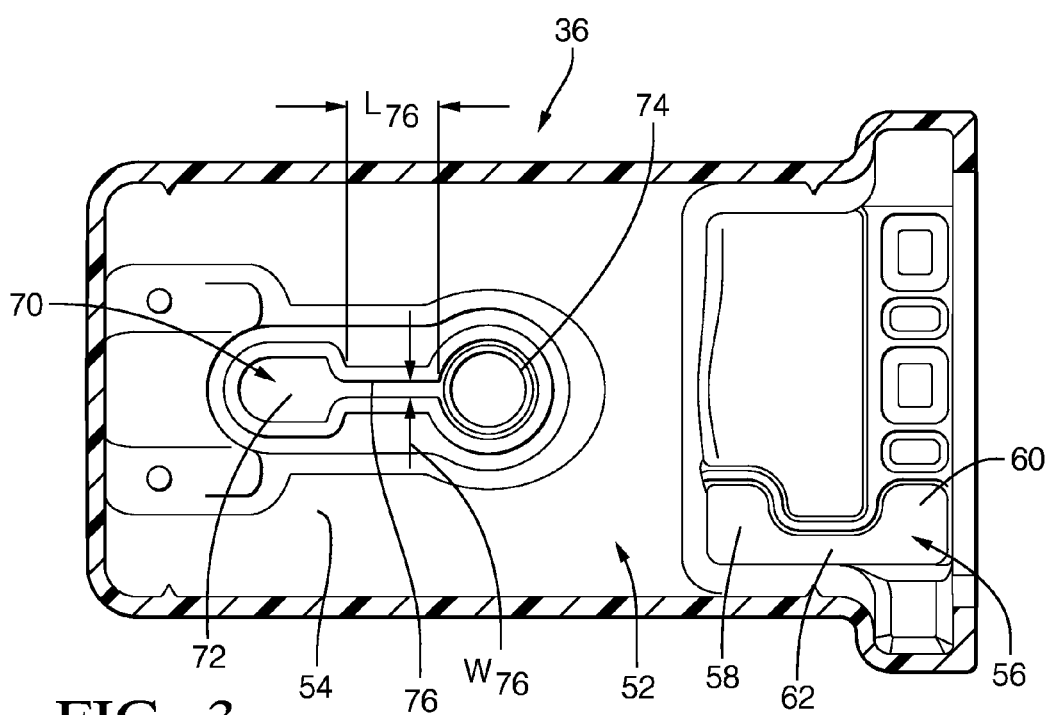
FIG. 3 is an elevation view of a case of the ignition coil of FIGS. 1 and 2 looking in the direction of arrow B of FIG. 1.

Reference will continue to be made to FIGS. 1 and 2 and additional reference will now be made to FIG. 3 which shows an elevation view of case 36 viewed in the direction of arrow B shown in FIG. 1. Case 36 defines a case interior 52 having an interior surface 54. Core 16, high permeance structure 18, primary winding spool 26, primary winding 28, secondary winding spool 32, secondary winding 34, high-voltage terminal 44, and low-voltage terminal 50 are located within case interior 52 but are not shown in FIG. 3.

Interior surface 54 of case 36 includes a low-voltage recess 56 therein. Low-voltage recess 56 includes a first low-voltage recess compartment 58 and a second low-voltage recess compartment 60 such that first low-voltage recess compartment 58 and second low-voltage recess compartment 60 are connected to each other by a low-voltage recess channel 62. Low-voltage end 46 of secondary winding 34 is disposed within first low-voltage recess compartment 58 while low-voltage terminal 50 is disposed within second low-voltage recess compartment 60. An electrically conductive polymer 64 is disposed within first low-voltage recess compartment 58, second low-voltage recess compartment 60, and low-voltage recess channel 62 such that electrically conductive polymer 64 directly places low-voltage end 46 of secondary winding 34 in electrical communication with low-voltage terminal 50. Electrically conductive polymer 64 may be, for example only, an electrically conductive epoxy or silicone and may contain, for example only about 15% to about 20% by volume carbon black.

Figure 5:
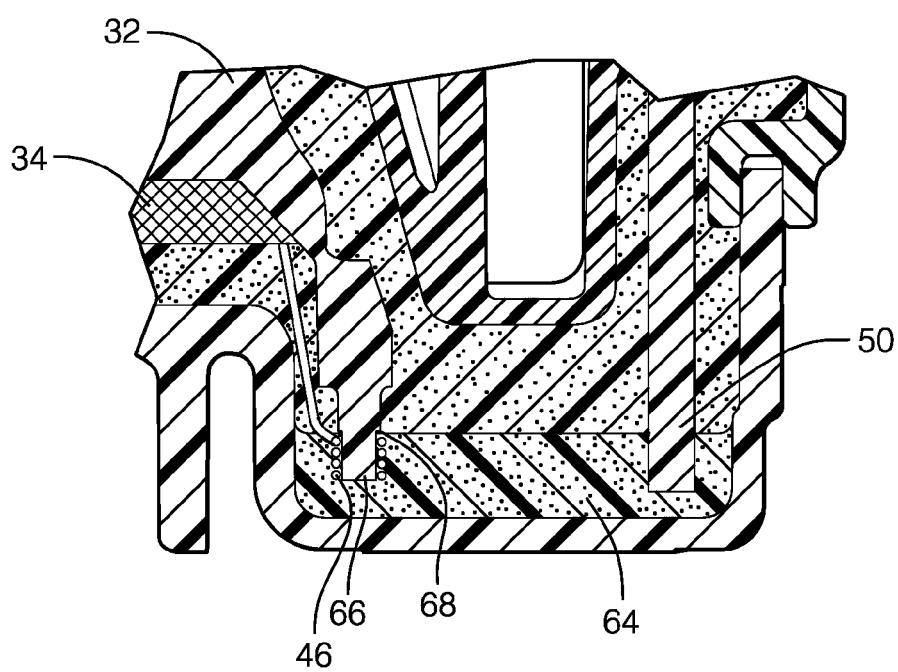
FIG. 5 is an enlarged portion of FIG. 2 showing a low-voltage end of the secondary winding.

Reference will continue to be made to FIGS. 1-3 and additional reference will now be made to FIG. 5 which is an enlarged portion of FIG. 2. In order to facilitate insertion of low-voltage end 46 of secondary winding 34 into electrically conductive polymer 64 during assembly, as will be described in greater detail below, low-voltage end 46 of secondary winding 34 may be wound around a low-voltage post 66 in order to provide support thereto. Low-voltage post 66 extends outward from secondary winding spool 32 and may be formed as an integral part thereof. Low-voltage post 66 may include a retention feature, illustrated as low-voltage post step 68, for preventing low-voltage end 46 of secondary winding 34 from sliding on low-voltage post 66 when low-voltage post 66 and low-voltage end 46 of secondary winding 34 are pushed into electrically conductive polymer 64 during assembly as will be described in greater detail later. While the retention feature has been illustrated as low-voltage post step 68, it should now be understood that other retention features may be used, for example only, a plurality of steps, ribs, barbs, or surface texture which prevents low-voltage end 46 of secondary winding 34 from sliding on low-voltage post 66 when low-voltage post 66 and low-voltage end 46 of secondary winding 34 are pushed into electrically conductive polymer 64.

Again with reference to FIGS. 1-3, interior surface 54 of case 36 also includes a high-voltage recess 70 therein. High-voltage recess 70 includes a first high-voltage recess compartment 72 and a second high-voltage recess compartment 74 such that first high-voltage recess compartment 72 and second high-voltage recess compartment 74 are connected to each other by a high-voltage recess channel 76. High-voltage end 48 of secondary winding 34 is disposed within first high-voltage recess compartment 72 while high-voltage terminal 44 is disposed within second high-voltage recess compartment 74. Electrically conductive polymer 64 is disposed within first high-voltage recess compartment 72, second high-voltage recess compartment 74, and high-voltage recess channel 76 such that electrically conductive polymer 64 directly places high-voltage end 48 of secondary winding 34 in electrical communication with high-voltage terminal 44. As describe previously, electrically conductive polymer 64 may be, for example only, an electrically conductive epoxy or silicone and may contain, for example only about 15% to about 20% by volume carbon black.

Figure 4:
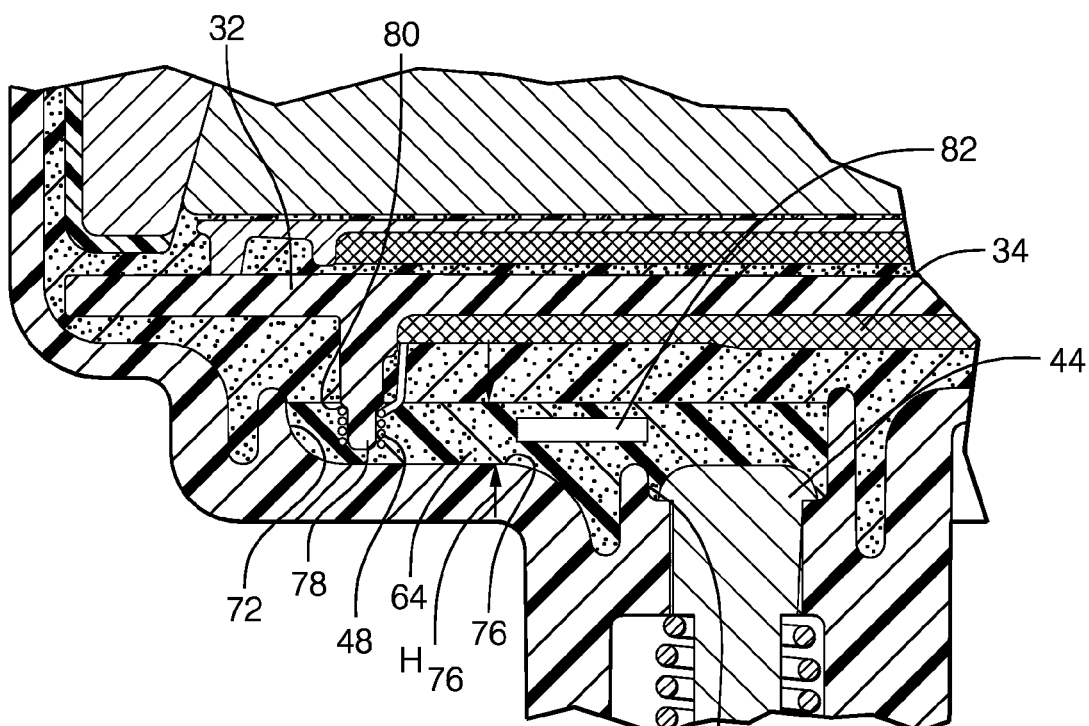
FIG. 4 is an enlarged portion of FIG. 1 showing a high-voltage end of a secondary winding.

Reference will continue to be made to FIGS. 1-3 and additional reference will now be made to FIG. 4 which is an enlarged portion of FIG. 1. Electrically conductive polymer 64 within high-voltage recess channel 76 may be used to form a suppression resistance between first high-voltage recess compartment 72 and second high-voltage recess compartment 74 for suppressing radio-frequency interference (RFI) in use of ignition coil 10. High-voltage recess channel 76 has a length $L_{76}$, a width $W_{76}$ and a height $H_{76}$ which may each be tailored to hold a predetermined volume of electrically conductive polymer 64 which results in a predetermined resistance between first high-voltage recess compartment 72 and second high-voltage recess compartment 74. The predetermined resistance may be, for example only, between about 500 ohms and about 2000 ohms. Using electrically conductive polymer 64 within high-voltage recess channel 76 for suppressing RFI reduces cost by eliminating the need for a separate resistor which is commonly used in ignition coils for suppressing RFI.

In order to facilitate insertion of high-voltage end 48 of secondary winding 34 into electrically conductive polymer 64 during assembly, as will be described in greater detail below, high-voltage end 48 of secondary winding 34 may be wound around a high-voltage post 78 in order to provide support thereto. High-voltage post 78 extends outward from secondary winding spool 32 and may be formed as an integral part thereof. High-voltage post 78 may include a retention feature, illustrated as high-voltage post step 80, for preventing high-voltage end 48 of secondary winding 34 from sliding on high-voltage post 78 when high-voltage post 78 and high-voltage end 48 of secondary winding 34 are pushed into electrically conductive polymer 64 during assembly as will be described in greater detail later. While the retention feature has been illustrated as high-voltage post step 80, it should now be understood that other retention features may be used, for example only, a plurality of steps, ribs, barbs, or surface texture which prevents high-voltage end 48 of secondary winding 34 from sliding on high-voltage post 78 when high-voltage post 78 and high-voltage end 48 of secondary winding 34 are pushed into electrically conductive polymer 64.

In order to further enhance the suppression of RFI, high-voltage post 78 may be a piece of steel that is press fit to secondary winding spool 32 rather than being integrally formed with secondary winding spool 32. Consequently, high-voltage end 48 of secondary winding 34 together with high-voltage post 78 forms an inductor which enhances the suppression of RFI. Alternatively, as shown in FIG. 4, an inductor 82 may be embedded within electrically conductive polymer 64 within high-voltage recess 70. Inductor 82 may be, for example only, an iron core with insulated copper wire wound thereabout.

Encapsulant 30 may be suitable for providing electrical insulation within ignition coil 10. In a preferred embodiment, encapsulant 30 may comprise an epoxy potting material. Sufficient encapsulant 30 is introduced in ignition coil 10, in the illustrated embodiment, to substantially fill the case interior 52. Encapsulant 30 also provides protection from environmental factors which may be encountered during the service life of ignition coil 10. There are a number of encapsulant materials known in the art.

Figure 6:
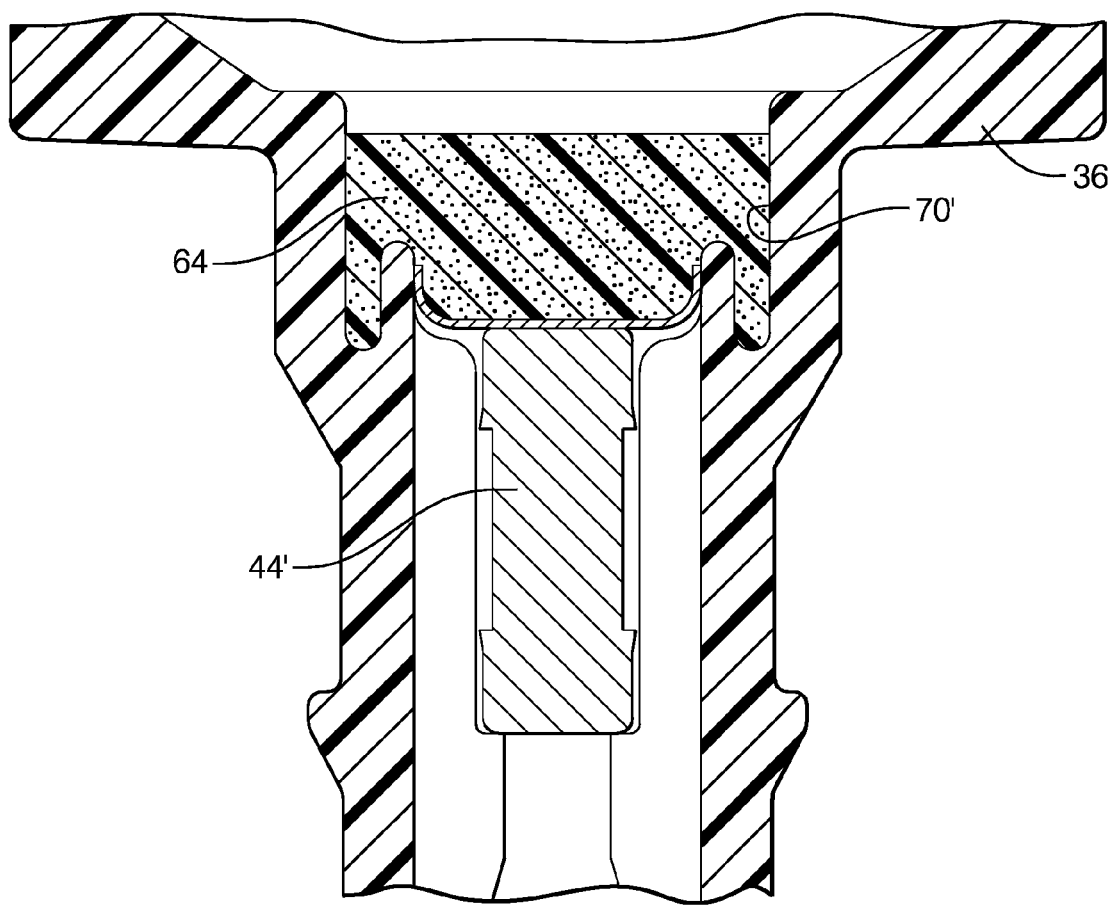
FIG. 6 is an alternative arrangement for a high-voltage recess of the ignition coil in accordance with the present invention.

Now with reference to FIG. 6, an alternative high-voltage recess 70' is shown where a high-voltage terminal 44' is press fit within high-voltage recess 70'. In order to minimize the electric field concentration between high-voltage terminal 44' and the portion of case 36 with which high-voltage terminal 44' is press fit, high-voltage recess 70' is arranged to surround the area of press fit between high-voltage terminal 44' and case 36. Consequently, electrically conductive polymer 64 will radially surround the portion of case 36 with which high-voltage terminal 44' is press fit thereby providing the same voltage radially inward and outward of the portion of case 36 with which high-voltage terminal 44' is press fit. In this way, the same effect taught in U.S. Pat. No. 8,564,392 to Skinner et al., the disclosure of which is incorporated herein by reference in its entirety, using a properly shaped high-voltage terminal may be achieved while using a high-voltage terminal with a more simple geometry.

Now with reference to FIGS. 1-5, a method of assembling ignition coil 10 will now be described where core 16, high permeance structure 18, primary winding spool 26, primary winding 28, secondary winding spool 32, and secondary winding 34 are provided together as a subassembly such that low-voltage end 46 of secondary winding 34 has been wrapped around low-voltage post 66 of secondary winding spool 32 and high-voltage end 48 of secondary winding 34 has been wrapped around high-voltage post 78 of secondary winding spool 32. First, high-voltage terminal 44 is disposed within second high-voltage recess compartment 74 of case 36. Next, electrically conductive polymer 64 is dispensed, in liquid form, within low-voltage recess 56 and high-voltage recess 70. More specifically, electrically conductive polymer 64 is dispensed within first low-voltage recess compartment 58, second low-voltage recess compartment 60, low-voltage recess channel 62, first high-voltage recess compartment 72, second high-voltage recess compartment 74, and high-voltage recess channel 76. It should be noted that high-voltage terminal 44 prevents electrically conductive polymer 64 from escaping from high-voltage recess 70 into high-voltage tower 42. Subsequently, while electrically conductive polymer 64 is still in liquid form, the subassembly comprising core 16, high permeance structure 18, primary winding spool 26, primary winding 28, secondary winding spool 32, and secondary winding 34 is positioned within case interior 52 of case 36 such that low-voltage post 66 together with low-voltage end 46 of secondary winding 34 are pressed into electrically conductive polymer 64 within first low-voltage recess compartment 58 and such that high-voltage post 78 together with high-voltage end 48 of secondary winding 34 are pressed into electrically conductive polymer 64 within first high-voltage recess compartment 72 in the direction of arrow B shown in FIG. 1. Low-voltage post step 68 prevents low-voltage end 46 of secondary winding 34 from sliding on low-voltage post 66 as low-voltage end 46 of secondary winding 34 is pressed into electrically conductive polymer 64. Similarly, high-voltage post step 80 prevents high-voltage end 48 of secondary winding 34 from sliding on high-voltage post 78 as high-voltage end 48 of secondary winding 34 is pressed into electrically conductive polymer 64. Also while electrically conductive polymer 64 is still in liquid form, low-voltage terminal 50 is pressed into second low-voltage recess compartment 60. Next, electrically conductive polymer 64 is cured, for example only, by the application of heat such that electrically conductive polymer 64 is no longer a liquid after being cured. After electrically conductive polymer 64 has been cured, encapsulant 30 is dispensed, in liquid form, within case interior 52 to fill the remaining space within case interior 52. Next encapsulant 30 is cured, for example only, by the application of heat such that encapsulant 30 is no longer a liquid after being cured.

Electrically connecting low-voltage end 46 of secondary winding 34 to low-voltage terminal 50 directly through electrically conductive polymer 64 eliminates the need for a costly and complex termination arrangement using solder or other similar metal bonding operations. Similarly, electrically connecting high-voltage end 48 of secondary winding 34 to high-voltage terminal 44 directly through electrically conductive polymer 64 eliminates the need for a costly and complex termination arrangement using solder or other similar metal bonding operations. Electrically connecting high-voltage end 48 of secondary winding 34 to high-voltage terminal 44 directly through electrically conductive polymer 64 also allows for simple and cost effective RFI suppression solutions. Furthermore, ignition coils with different placements of high-voltage tower 42 may be needed to meet different packaging requirements. Electrically connecting high-voltage end 48 of secondary winding 34 to high-voltage terminal 44 directly through electrically conductive polymer 64 allows for ignition coils with different placements of high-voltage tower 42 without the need to modify the subassembly comprising core 16, high permeance structure 18, primary winding spool 26, primary winding 28, and secondary winding spool 32. Instead case 36, can be tailored to shorten or lengthen high-voltage recess channel 76 to accommodate the desired location of high-voltage tower 42. Modifying case 36 may be simpler and less costly than making the necessary modifications to the subassembly comprising core 16, high permeance structure 18, primary winding spool 26, primary winding 28, and secondary winding spool 32 in order to achieve the desired location of high-voltage tower 42.

While a specific configuration of ignition coil 10 has been described, it should be understood that the present invention is applicable for use in a variety of ignition coil configurations.

While electrically conductive polymer 64 has been described for use with both low-voltage end 46 and high-voltage end 48 of secondary winding 34, it should now be understood that one end of secondary winding 34 may be connected to its respective terminal using conventional techniques while the other end may be connected to its respective terminal with electrically conductive polymer 64.

While electrically conductive polymer 64 has been described for use with both low-voltage end 46 and high-voltage end 48 of secondary winding 34, it should now be understood that electrically conductive polymers of differing compositions may be used for each end of secondary winding 34.

While this invention has been described in terms of preferred embodiments thereof, it is not intended to be so limited, but rather only to the extent set forth in the claims that follow.

We claim:

1. An ignition coil for delivering a spark-generating current to a spark plug; said ignition coil comprising:
   a magnetically-permeable core;
   a primary winding disposed outward of said core; and
   a secondary winding disposed outward of said primary winding and inductively coupled to said primary winding, said secondary winding terminating at one end thereof in a low-voltage end and terminating at another end thereof in a high-voltage end;
   wherein at least one of said low-voltage end of said secondary winding and said high-voltage end of said secondary winding is electrically connected directly to a terminal through an electrically conductive polymer;
   wherein said terminal is a high-voltage terminal and said high-voltage end of said secondary winding is electrically connected directly to said high-voltage terminal through said electrically conductive polymer;
   wherein said ignition coil further comprises a case defining an interior having an interior surface such that said core, said primary winding, and said secondary winding are received within said interior of said case, said interior surface defining a high-voltage recess therein such that said high-voltage end of said secondary winding, said high-voltage terminal, and said electrically conductive polymer are disposed within said high-voltage recess; and
   wherein said ignition coil further comprises a secondary winding spool upon which said secondary winding is wound, said secondary winding spool having a high-voltage post extending therefrom such that said high-voltage end of said secondary winding is wrapped around said high-voltage post.

2. An ignition coil as in claim 1 wherein said high-voltage post is disposed within said high-voltage recess of said case.

3. An ignition coil as in claim 1 wherein said high-voltage post is steel, whereby said high-voltage end of said secondary winding wrapped around said high-voltage post forms an inductor which reduces RFI in use.

4. An ignition coil as in claim 2 wherein said high-voltage post includes a retention feature for preventing said high-voltage end of said secondary winding from sliding on said high-voltage post when said high-voltage post and said high-voltage end of said secondary winding are inserted into said high-voltage recess containing said electrically conductive polymer.

5. An ignition coil as in claim 4 wherein said retention feature is a step.

6. An ignition coil for delivering a spark-generating current to a spark plug; said ignition coil comprising:

a magnetically-permeable core;

a primary winding disposed outward of said core; and a secondary winding disposed outward of said primary winding and inductively coupled to said primary winding, said secondary winding terminating at one end thereof in a low-voltage end and terminating at another end thereof in a high-voltage end;

wherein at least one of said low-voltage end of said secondary winding and said high-voltage end of said secondary winding is electrically connected directly to a terminal through an electrically conductive polymer;

wherein said terminal is a high-voltage terminal and said high-voltage end of said secondary winding is electrically connected directly to said high-voltage terminal through said electrically conductive polymer; and wherein said ignition coil further comprises a case defining an interior having an interior surface such that said core, said primary winding, and said secondary winding are received within said interior of said case, said interior surface defining a high-voltage recess therein such that said high-voltage end of said secondary winding, said high-voltage terminal, and said electrically conductive polymer are disposed within said high-voltage recess, wherein said high-voltage recess comprises:

a first high-voltage recess compartment with said high-voltage end of said secondary winding and said electrically conductive polymer disposed therein;

a second high-voltage recess compartment with said high-voltage terminal and said electrically conductive polymer disposed therein; and a high-voltage recess channel connecting said first high-voltage recess compartment to said second high-voltage recess compartment with said electrically conductive polymer disposed therein.

7. An ignition coil as in claim 6 wherein said high-voltage recess channel has a width that is narrower than said first high-voltage recess compartment and said second high-voltage recess compartment.

8. An ignition coil as in claim 6 wherein said electrically conductive polymer within said high-voltage recess channel acts as a resistor for reducing RFI in use.

9. An ignition coil as in claim 8 wherein said electrically conductive polymer within said high-voltage recess channel has a resistance between about 500 ohms and about 2000 ohms.

10. An ignition coil as in claim 3 further comprising an inductor within said high-voltage recess between said high-voltage end of said secondary winding and said high-voltage terminal which reduces RFI in use.

11. A method of assembling an ignition coil for delivering a spark-generating current to a spark plug, the ignition coil comprising a magnetically-permeable core, a primary winding disposed outward of said core, a secondary winding disposed outward of said primary winding and inductively coupled to said primary winding, said secondary winding terminating at one end thereof in a low-voltage end and terminating at another end thereof in a high-voltage end, a case defining an interior having an interior surface defining a high-voltage recess therein, and a secondary winding spool upon which said secondary winding is wound, said secondary winding spool having a high-voltage post extending therefrom; said method comprising:

providing an electrically conductive polymer;

using said electrically conductive polymer to directly electrically connect at least one of said low-voltage end of said secondary winding and said high-voltage end of said secondary winding to a terminal through said electrically conductive polymer, wherein said terminal is a high-voltage terminal and said high-voltage end of said secondary winding is connected directly electrically to said high-voltage terminal through said electrically conductive polymer;

dispensing said electrically conductive polymer within said high-voltage recess;

positioning said high-voltage end of said secondary winding within said high-voltage recess, wherein said step of positioning said high-voltage end of said secondary winding within said high-voltage recess is after said step of dispensing said electrically conductive polymer and includes positioning said high-voltage end of said secondary winding within said electrically conductive polymer; and wrapping said high-voltage end of said secondary winding around said high-voltage post before said step of positioning said high-voltage end of said secondary winding within said high-voltage recess.

12. A method as in claim 11 wherein said step of positioning said high-voltage end of said secondary winding within said electrically conductive polymer includes positioning said high-voltage post within said electrically conductive polymer.

13. A method as in claim 11 wherein said high-voltage post is steel, said method further comprising using said high-voltage end of said secondary winding and said high-voltage post as an inductor to reduce RFI in use.

14. A method of assembling an ignition coil for delivering a spark-generating current to a spark plug, the ignition coil comprising a magnetically-permeable core, a primary winding disposed outward of said core, a secondary winding disposed outward of said primary winding and inductively coupled to said primary winding, said secondary winding terminating at one end thereof in a low-voltage end and terminating at another end thereof in a high-voltage end, and a case defining an interior having an interior surface defining a high-voltage recess therein, wherein said high-voltage recess comprises a first high-voltage recess compartment, a second high-voltage recess compartment, and a high-voltage recess channel connecting said first high-voltage recess compartment to said second high-voltage recess compartment; said method comprising:

providing an electrically conductive polymer;

using said electrically conductive polymer to directly electrically connect at least one of said low-voltage end of said secondary winding and said high-voltage end of said secondary winding to a terminal through said electrically conductive polymer, wherein said terminal is a high-voltage terminal and said high-voltage end of said secondary winding is connected directly electrically to said high-voltage terminal through said electrically conductive polymer;

dispensing said electrically conductive polymer within said high-voltage recess;

positioning said high-voltage end of said secondary winding within said high-voltage recess; and positioning said high-voltage terminal within said high-voltage recess before said step of dispensing said electrically conductive polymer; wherein:

said step of positioning said high-voltage end of said secondary winding within said high-voltage recess includes positioning said high-voltage end of said secondary winding within said first high-voltage recess compartment;

said step of positioning said high-voltage terminal within said high-voltage recess includes positioning said high-voltage terminal within said second high-voltage recess compartment; and said step of dispensing said electrically conductive polymer within said high-voltage recess includes dispensing said electrically conductive polymer within said first high-voltage recess compartment, said second high-voltage recess compartment, and said high-voltage recess channel.

15. A method as in claim 14 wherein said high-voltage recess channel has a width that is narrower than said first high-voltage recess compartment and said second high-voltage recess compartment.

16. A method as in claim 14 further comprising using said electrically conductive polymer within said high-voltage recess channel as a resistor to reduce RFI in use.

17. A method as in claim 16 wherein said electrically conductive polymer within said high-voltage recess channel has a resistance between about 500 ohms and about 2000 ohms.

18. An ignition coil for delivering a spark-generating current to a spark plug; said ignition coil comprising:
a magnetically-permeable core;
a primary winding disposed outward of said core;
a secondary winding disposed outward of said primary winding and inductively coupled to said primary winding, said secondary winding terminating at one end thereof in a low-voltage end and terminating at another end thereof in a high-voltage end, wherein one of said low-voltage end of said secondary winding and said high-voltage end of said secondary winding is electrically connected directly to a terminal through an electrically conductive polymer;
a case defining an interior having an interior surface such that said core, said primary winding, and said secondary winding are received within said interior of said case, said interior surface defining a recess therein such that said one of said low-voltage end and said high-voltage end of said secondary winding, said terminal, and said electrically conductive polymer are disposed within said recess; and
a secondary winding spool upon which said secondary winding is wound, said secondary winding spool having a post extending therefrom such that said one of said low-voltage end and said high-voltage end of said secondary winding is wrapped around said post.

19. An ignition coil as in claim 18 wherein said post is disposed within said recess of said case.

20. An ignition coil as in claim 18 wherein said post includes a retention feature for preventing said one of said low-voltage end and said high-voltage end of said secondary winding from sliding on said post when said post and said one of said low-voltage end and said high-voltage end of said secondary winding are inserted into said recess containing said electrically conductive polymer.

21. An ignition coil as in claim 20 wherein said retention feature is a step.

22. An ignition coil as in claim 18 wherein said recess comprises:
a first recess compartment with said one of said low-voltage end and said high-voltage end of said secondary winding and said electrically conductive polymer disposed therein;
a second recess compartment with said terminal and said electrically conductive polymer disposed therein; and
a recess channel connecting said first recess compartment to said second recess compartment with said electrically conductive polymer disposed therein.

23. An ignition coil as in claim 22 wherein said recess channel has a width that is narrower than said first recess compartment and said second recess compartment.

* * * * *